Nov. 7, 1967  T. MILLNER ET AL  3,351,438
TUNGSTEN INCANDESCENT BODY OF LARGE CRYSTALLINE STRUCTURE
AND PROCESS FOR ITS PRODUCTION
Filed Sept. 11, 1964

INVENTORS
TIVADAR MILLNER
JENŐ NEUGEBAUER
LÁSZLÓ KERÉNYI

BY Blum, Moscovitz,
Friedman, Blum & Kaplan

United States Patent Office 3,351,438
Patented Nov. 7, 1967

3,351,438
TUNGSTEN INCANDESCENT BODY OF LARGE CRYSTALLINE STRUCTURE AND PROCESS FOR ITS PRODUCTION
Tivadar Millner, Jenö Neugebauer, and László Kerènyi, Budapest, Hungary, assignors to Egyesult Izzolampa és Villamossagi Reszvenytarsasag, Budapest, Hungary, a Hungarian enterprise
Filed Sept. 11, 1964, Ser. No. 395,797
Claims priority, application Hungary, Sept. 20, 1963, MA–1,282
4 Claims. (Cl. 29—182)

ABSTRACT OF THE DISCLOSURE

A sintered tungsten body of large crystalline tungsten structure which contains gallium as well as an alkali metal and silicon. The same is produced by a process by adding to a tungsten acid paste, a solution incorporating potassium and silicon, as a potassium silicate, and a solution of a gallium compound; the gallium content in the initial paste composition expressed in a $Ga_2O_3:WO_3$ ratio being in the range of 0.00001:1 to 0.05:1, and the initial past composition aforesaid being dried and dehydrated and then reduced to metal powder in the hydrogen stream at high temperature, the metal powder so prepared being processed to a rod by pressing and sintering followed by swaging and wire drawing.

---

It is known that tungsten in its pure condition is unsuitable for uses where it is subjected to heating at high temperatures and where a deformation during heating or breaking during mechanical stresses after heating are not permissible. In order to render the tungsten suitable for such purposes, additives are used which transform the tungsten structure into a large crystalline structure. When the tungsten has acquired such structure and has the form of a wire, a helix or the like, it becomes suitable for the above mentioned purposes. The most suitable composition is the one where K, Si and Al are added, and the additives are generally admixed to the oxide of the tungsten prior to its reduction to a metal.

The tungsten thus containing K, Si and Al however also has certain drawbacks, although the incandescent bodies prepared therefrom are not deformed during the heating and retain sufficient plasticity after their heating. One detrimental feature of such tungsten is that its processing (swaging, wire-drawing, spiralisation) is more difficult and involved more waste than does tungsten not containing the three above mentioned additives in combination and which, therefore does not have such a large crystalline structure. Another disadvantageous fact is that even the good properties are lost if the protective gas atmosphere in which heating is performed contains even the slightest amount of impurities. Thus, even a water vapour and oxygen-content of the protective gas is detrimental.

It has been found that the described disadvantages are eliminated to a large extent if gallium is added to the tungsten instead of aluminum in addition to Si and alkali metals, e.g. K. In this case none of those desired properties are lost which, as was up to now believed, required the presence of aluminum. At the same time, a readily workable metal is obtained, which is less sensitive to the impurities (contaminations) of the protective gas and whose strength increases with recrystallisation.

The gallium content of the large crystalline tungsten body should be in the order of magnitude of at least 0.0001%. The gallium content of the initial material should be therefore—expressed in a $Ga_2O_3:WO_3$ ratio— between 0.00001:1 to 0.05:1.

The tungsten incandescent body according to the invention having a large crystalline structure may be prepared in the manner described below. It is understood that this example merely serves as an illustrative embodiment.

To tungsten acid ($WO_3 \cdot H_2O$) paste a potassium silicate solution is added in such an amount that the K content expressed in KCl is 0.40%, the Si content expressed in $SiO_2$ is 0.30%, and the solution of $Ga(NO_3)_3$ is added in such an amount that the Ga content expressed in $Ga_2O_3$ is 0.05%. The tungsten acid paste so prepared is dried, dehydrated at 300° C., and then reduced to metal powder in a hydrogen stream (current) at temperatures rising up to 850° C. The metal powder so prepared is processed in the manner usual in tungsten manufacture to a compound rod by pressing and sintering. The rod contains gallium in a demonstrable amount, and the manufacturing conditions may be set so—in the manner known in tungsten manufacture—that visible crystals should be present on its surface. The large crystalline incandescent filament of for example 220 volt 40 watt incandescent lamps can be obtained from this rod by swaging, wire-drawing and spiralisation.

Because of the easier processing, 5% less tungsten powder should be used than in case of the conventional incandescent filaments containing aluminum. The bump test of a lamp provided with such an incandescent filament shows a strength index higher by about 20% than those with conventional filaments. In consequence, the incandescent lamps according to the invention may be applied to good advantage even in fields of application subjected to high shock stresses.

The tungsten incandescent bodies according to the invention may be prepared in various other ways within the scope of the invention, and may be used not only in incandescent lamps but in other fields of vacuum technics, such as electron tubes, luminescent tubes and the like.

The invention is illustrated by way of example in the accompanying drawing, which forms part of the application and in which.

Figure 1:
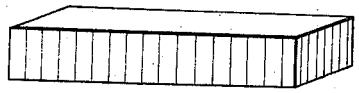
FIG. 1 illustrates a tungsten rod made of tungsten prepared according to the present invention.
Figure 2:
FIG. 2 illustrates a tungsten filament made of tungsten prepared according to the present invention.
Figure 3:
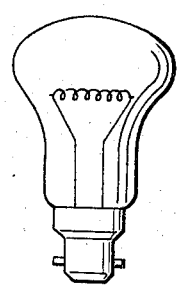
FIG. 3 illustrates an incandescent lamp containing a tungsten filament prepared according to the present invention.
Figure 4:
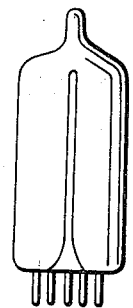
FIG. 4 illustrates an electron valve containing a tungsten element prepared in accordance with the present invention.
Figure 5:
FIG. 5 illustrates a fluorescent tube containing tungsten filaments prepared in accordance with the present invention.

What we claim is:

1. A sintered tungsten body of large crystalline tungsten structure effective for incandescence, said tungsten body containing gallium and in which the gallium to tungsten content expressed as the ratio of $Ga_2O_3:WO_3$ of the initial material from which the tungsten body is prepared, is between about 0.00001:1 and 0.05:1.

2. A sintered tungsten body according to claim 1, said body also containing silicon expressed as $SiO_2$ in an amount of about 0.3% by weight, and potassium expressed as KCl in an amount of about 0.4% by weight.

3. Method of producing sintered tungsten of large crystalline structure, which comprises mixing a gallium compound capable of forming an oxide with tungsten oxide in an amount such that the ratio of $Ga_2O_3:WO_3$ is between about 0.00001:1 and 0.05:1, reducing the resulting oxide mixture to metal powder, and pressing and sintering the resulting metal powder into a solid body.

4. Method according to claim 3 in which the reduction to metal powder is carried out in a hydrogen stream at a temperature of up to about 850° C.

References Cited

UNITED STATES PATENTS

| 1,026,384 | 5/1912 | Coolidge | 75—207 |
| 1,602,526 | 10/1926 | Gero | 75—207 |
| 2,431,690 | 12/1947 | Hall et al. | 29—182 |
| 3,210,589 | 10/1965 | Mason | 75—207 |
| 3,236,699 | 2/1966 | Pugh et al. | 75—207 |

L. DEWAYNE RUTLEDGE, *Primary Examiner.*

R. L. GRUDZIECKI, *Assistant Examiner.*